2,862,575
Patented Dec. 2, 1958

2,862,575

A METHOD FOR THE SEPARATION OF DIBORANE FROM A GASEOUS MIXTURE

Ralph K. Birdwhistell, East Lansing, Mich., Ralph E. Johnson, Fort Worth, Tex., and Laurence L. Quill, East Lansing, Mich., assignors, by mesne assignments, to Olin Mathieson Chemical Corporation, a corporation of Virginia No Drawing. Application July 9, 1956
Serial No. 596,416

4 Claims. (Cl. 183—115)

This invention relates to an improved process for the separation of gaseous mixtures containing diborane and for the recovery of diborane therefrom.

In various processes for the manufacture of diborane, it is usually obtained in a mixture with diluent gases, particularly nitrogen. Frequently hydrogen is also present in the gas mixtures formed in the synthesis of diborane.

The most obvious method of purification is to freeze out the diborane by cooling the gas mixture with liquid nitrogen and discharging uncondensed hydrogen and nitrogen. The uncondensed gases carry entrained diborane and losses are inevitable. The required low-temperature cooling is very expensive and a more economical method is needed. Thermal diffusion is immediately excluded as a method because of the deleterious effect of heat on diborane, converting it to mixtures of other boron hydrides. Low temperature thermal diffusion is also expensive in requiring cooling to suitably low temperatures.

Gaseous diffusion through porous media is useful for the separation of gas mixtures where the components are of substantially different molecular weights. Separation by this process depends on Graham's law that the relative rates of diffusion are inversely proportional to the square roots of the molecular weights of the gases. It can be readily predicted on this basis that a mixture of hydrogen and diborane can be separated easily by diffusion since their molecular weights are 2 and 27.6 respectively. It can also be predicted that the separation of diborane and nitrogen by this method would be very difficult since their molecular weights are 27.6 and 28 respectively. These predictions have been verified experimentally using porous barriers.

The rate of permeation of gases through non-porous barriers is known to be quite a different process from that of gaseous diffusion as described by Graham's law. The permeation process has been described by Fick's law which, however, depends on an independent determination of a specific permeation factor characteristic for each combination of barrier material, thickness, temperature and gas. Relative rates of permeation have not been correlated directly with any physical or chemical property of the gas independently of the barrier medium and other unknown factors. Prediction in this field at present is much less possible than in the field of catalysis or of chemical reactions.

The process of the present invention depends on the discovery that the rates of permeation of diborane, nitrogen and hydrogen through silicone rubber barriers affords an excellent means of separation of mixtures of diborane and nitrogen or gas mixtures containing them as components. When these gases are allowed to permeate a silicone rubber membrane, it is surprisingly found that diborane traverses the membrane at a considerably greater rate than either hydrogen or nitrogen. The permeation of these same gases through various plastic membranes, for example, cellulose acetate, cellulose acetate-butyrate, polyethylene, and polymeric trifluorochloroethylene or their diffusion through porous metal barriers gave no such advantageous results. Diborane permeates silicone rubber membranes at a rate approximately twice as fast as hydrogen and four to five times as fast as nitrogen. No theoretical speculations are presented for these observed facts. However, their practical value can hardly be over estimated. Diborane-nitrogen mixtures or hydrogen-diborane-nitrogen mixtures can readily be separated by permeation of multiple silicone rubber barriers at ordinary temperatures, e. g., from 0° C. to 50° C., substantially pure diborane permeating through the last stage membrane. Gases retained by intermediate barriers are recycled to earlier stages in known manner. Residual mixtures of hydrogen and nitrogen, substantially free of diborane, are readily resolved in a parallel system of permeation barriers of silicone rubber or other materials and recycled to the operation generating the gas mixture. Diffusion through a porous medium is also suitable for the separation of hydrogen-nitrogen mixtures. Binary mixtures of diborane and nitrogen, inseparable by diffusion methods, are simply separated by a series of silicone rubber barriers recycling retained mixtures until pure diborane diffuses from one end of the system and pure nitrogen is obtained as a residual (non-diffused) gas from the opposite end of the system.

The silicone rubbers used according to the process of the present invention are well-known articles of commerce. They are prepared, for example, by the hydrolysis of dimethylsilicon dichloride and the immediate product is converted to an elastomer by heating with ferric chloride, sulfuric acid or caustic alkalies which are subsequently removed by thorough washing. The resulting rubber may be filled by the usual fillers, e. g., calcium carbonate and cured by heating with or without litharge, aluminum chloride or other curing agents. The silicone rubber products are characterized by outstanding thermal stability being unaffected by temperatures from −70° C. to +500° C., excellent electrical properties, low permanent compression set and low water absorption. Membranes of silicone rubber may be unsupported or reinforced by application to glass cloth.

Various barriers were tested in an apparatus in which the barrier was clamped in a tubular system arranged to be evacuated on both sides of the barrier, for the measurement of pressures on both sides of the barrier, and for the introduction of the gases on one side of the barrier. The system was closed to the atmosphere and evacuated on both sides of the test barrier to a pressure below 0.05 microns. The gas to be tested was then introduced into the system on one side of the barrier under known pressure. Diffusion through the barrier was followed by pressure measurements on the opposite side of the barrier and the diffused gas was analyzed to determine its composition. In this way the data of the following examples were obtained.

Example I

Hydrogen was supplied to one side of a silicone-rubber membrane ("Silastic," manufactured by Dow Corning Corp.), having a thickness of 0.001 inch, to a pressure of 272 microns and the pressure on the opposite side of the membrane rose in 30 minutes from an initial pressure of 0.03 microns to 0.78 millimeters (of mercury). The rate of pressure rise was 0.026 mm./min.

Nitrogen supplied in a comparable manner to one side of the same evacuated system at a pressure of 267 microns showed a pressure rise to 0.33 millimeters in 30 minutes. The rate was 0.011 mm./min.

Diborane similarly supplied at 276 microns showed a pressure rise on the opposite side of the diaphragm of 1.52 millimeters in 30 minutes. The rate was 0.051 mm./min.

The relative rates of permeation of hydrogen, diborane and nitrogen through this silicone rubber membrane was 236:464:100. The diborane diffused through this membrane nearly twice as fast as hydrogen and 4.64 times as fast as nitrogen.

*Example II*

In the apparatus and using the procedure of Example I, hydrogen, diborane and nitrogen were supplied at pressures of 186, 201 and 192 microns. After 30 minutes the respective pressures were 0.72, 1.35 and 0.27 millimeters. The relative rates of permeation were 266:500:100, respectively, substantially in agreement with the data of Example I.

*Example III*

Hydrogen, diborane and nitrogen were supplied at pressures of 282, 297 and 274 microns respectively to one side of a silicone rubber barrier having a thickness of 0.001 inch. Following the procedure of Example I, the respective pressures after 30 minutes were 0.62, 1.29 and 0.28 millimeters, respectively. The relative permeation rates were 122:461:100 showing that the rate of diborane permeation was 2.08 times that of hydrogen and 4.61 times that of nitrogen permeation through this barrier.

*Example IV*

When hydrogen, diborane and nitrogen were supplied at pressures of 50, 55 and 47 microns respectively to the same silicone rubber barrier as used in Example III, the absolute rates were lower but the relative rates were substantially unchanged. After 30 minutes the pressures on the opposite side of the barrier were 0.17, 0.34 and 0.074 millimeters respectively. The relative permeation rates were 230:460:100. This barrier passed diborane twice as fast as hydrogen and 4.6 times as fast as nitrogen.

For comparison other barrier materials were tested using initial pressures of 47 to 50 microns. Final pressures after 30 minutes were measured and the calculated relative rates of permeation are shown in the following table:

| Barrier material | Thickness, inches | Final pressure, mm. | | | Relative rates | | |
|---|---|---|---|---|---|---|---|
| | | $H_2$ | $B_2H_6$ | $N_2$ | $H_2$ | $B_2H_6$ | $N_2$ |
| Polyethylene | 0.001 | 33.0 | 5.4 | 5.3 | 624 | 102 | 100 |
| Cellulose acetate | 0.001 | 17.0 | 0.9 | 0.97 | 1,750 | 93 | 100 |
| Cellulose butyrate | 0.001 | 74.0 | 24.0 | 7.5 | 985 | 320 | 100 |

Each of these barriers passed hydrogen at a considerably higher rate than it did diborane or nitrogen. However, the relative rates of permeation of diborane and nitrogen through polyethylene and cellulose acetate were too nearly the same to provide a basis for separation. Significant differences in rates appeared using cellulose butyrate but the value for diborane was intermediate those for hydrogen and nitrogen. A separation process based on these data would require multiple processing operations to remove both the more permeable hydrogen and the less permeable nitrogen from the diborane. The cellulose butyrate barrier does not have the advantage of the silicone rubber barriers in being most permeable to diborane.

It is claimed:

1. A method for the separation of diborane from a gaseous mixture consisting essentially of diborane and at least one of the gases hydrogen and nitrogen which comprises diffusing the mixture through a methyl silicone rubber membrane whereby a gaseous product enriched in diborane content is produced.

2. The method of claim 1 wherein said gaseous mixture consists essentially of diborane and hydrogen.

3. The method of claim 1 wherein said gaseous mixture consists essentially of diborane and nitrogen.

4. The method of claim 1 wherein said gaseous mixture consists essentially of a mixture of diborane, hydrogen and nitrogen.

No references cited.